(No Model.)
A. MONTANT.
AUTOMATIC SUPPORTING DEVICE.
No. 315,650. Patented Apr. 14, 1885.
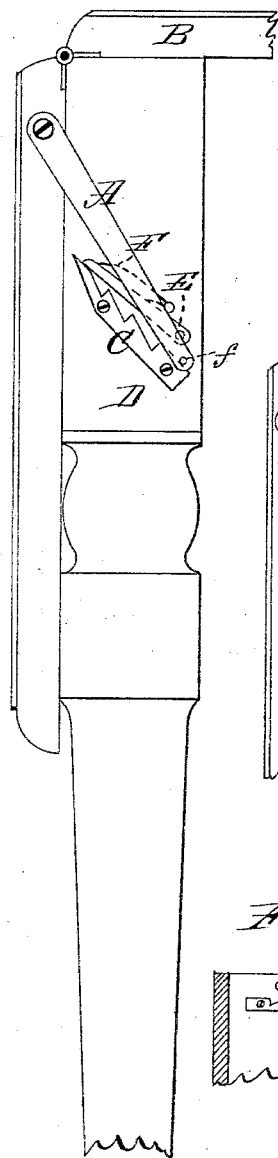
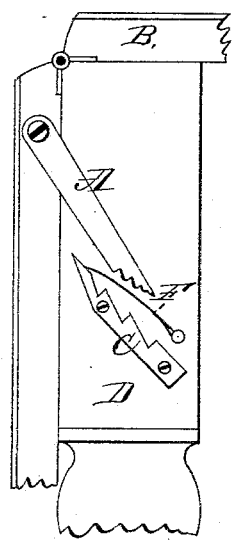
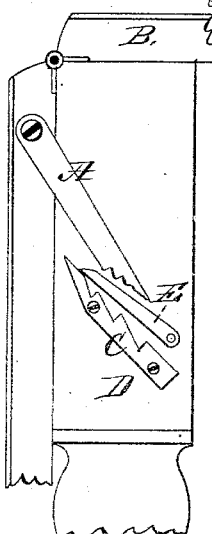
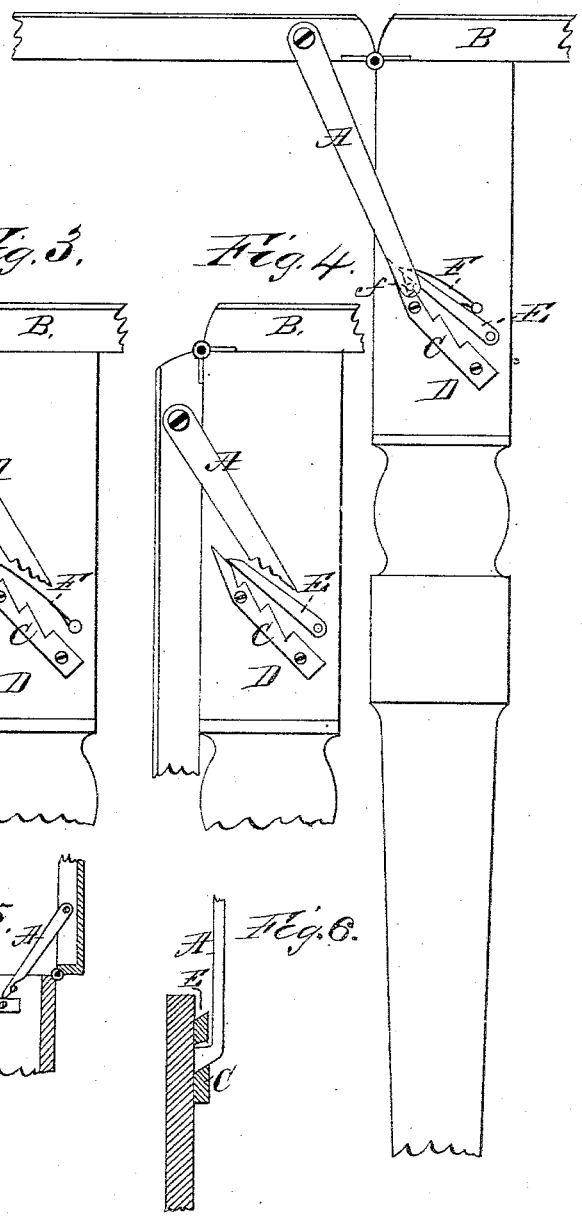
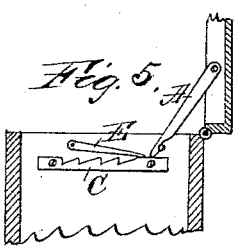
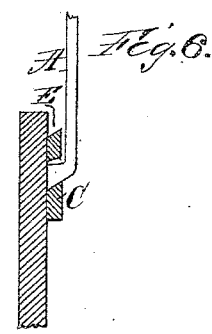
WITNESSES:
James Warner
Stephen A. Powell
INVENTOR
Alphonse Montant
BY his Atty.
W. L. Bennem

UNITED STATES PATENT OFFICE.

ALPHONSE MONTANT, OF NEW YORK, N. Y.

AUTOMATIC SUPPORTING DEVICE.

SPECIFICATION forming part of Letters Patent No. 315,650, dated April 14, 1885.

Application filed November 18, 1882. (No model.)

*To all whom it may concern:*

Be it known that I, ALPHONSE MONTANT, of the city, county, and State of New York, have made certain new and useful Improvements in Automatic Supporting Devices for Desks, Trunks, Tables, &c.; and I do hereby declare that the following, taken in connection with the drawings, is a full, clear, and exact description and specification of the same.

The object of my invention is to apply to the lids of boxes, trunks, school-desks, or to anything with which a support or catch is used, an automatic supporting device.

The said improvements consist in a support-arm one end of which is loosely attached to the lid of a desk. The other end of this bar is provided with a pin inserted at right angles with the arm, which pin engages with the teeth of a ratchet-bar, said bar being fastened to the standard or leg of the desk. Above the rack, and nearly of the same length, is a strip of metal, which is placed just far enough above the rack to allow the pin of the arm to move freely between them. The strip is pivoted at one end, the other end being pressed against the rack by a spring, and is so arranged as to allow the pin which is attached to the arm to pass the point of the rack and strip, and also prevents the pin from returning in its tracks.

In order that the invention may be fully understood, I have represented in the accompanying drawings, and will proceed to describe, an automatic supporting device embodying my improvements in the best form in which they have been embodied at this date.

Figure 1 of said drawings represents so much of a table as is necessary to show the application of my automatic supporting device, the leaf of the table being down. Fig. 2 represents a side view of the same with the leaf of the table raised. Fig. 3 represents a side view of the same with the strip removed. Fig. 4 represents a side view of the same with the spring removed. Figs. 5 and 6, inclusive, represent detached views of my automatic supporting device.

The arm A of the automatic supporting device, as represented in the drawings, is secured loosely to the leaf of the table B, and at the other end is fitted with a pin, *f*, which is at right angles to the arm A, and this pin engages with the teeth of the ratchet bar or rack C, attached to the leg D of the table, and holds the leaf at any desired inclination. Strip E is placed near to the rack C, and is of shorter length, and pivoted at one end just far enough from the rack to allow the pin *f* to move freely between them.

A spring, F, is provided for the purpose of controlling the movement of the pivoted piece E, which in turn controls the movement of the arm A. This spring F is secured to the table-leg by screws, as shown at Figs. 1 and 2 in the drawings.

The operation of my automatic supporting device is as follows: The leaf of the table is raised to any desired height, when the arm, by its own gravitation, will engage in one of the teeth of the rack. To disengage the table-leaf, it is raised still higher until the pin *f* on the end of the arm comes in contact with pivoted piece E, which is pressed by the spring F at the end of the rack, and the pin *f* forces the piece E back enough to allow the pin to pass through the opening and on top of the strip E and spring F, which it follows down and falls again upon the rack, and is again ready for use, as the leaf is closed, the strip E and spring F thus acting as a switch.

It is clear that either the strip or spring can be dispensed with, as the device is equally effective with either one alone, the object being to switch the arm away from the rack on its return travel. Of course the arm and the pin can be made in one piece, and in the case of a lid of a box-support the arm can act directly on the rack, the pin only acting on the switch. As shown in cross-section, Fig. 7, the rack, arm, pin, and switch are made beveled, so as to avoid having to put guides to keep the arm on the rack and switch, which guides are however in some cases necessary.

What I claim as my invention, and desire to secure by Letters Patent, is—

The combination, with the frame or body of a desk, trunk, or similar article, of a hinged back or top, a gravitating arm, A, pivoted to the said back or top, a pin, *f*, a fixed notched rack, C, and a spring, F, the whole being constructed and adapted to operate substantially as shown and described.

Witness my hand this 30th day of October, A. D. 1882.

ALPHONSE MONTANT.

Witnesses:
W. L. BENNEM,
JAMES WARNER.